US006856987B2

(12) United States Patent
Kobayashi et al.

(10) Patent No.: US 6,856,987 B2
(45) Date of Patent: Feb. 15, 2005

(54) INFORMATION SEARCH APPARATUS AND METHOD, AND COMPUTER READABLE MEMORY

(75) Inventors: Yuji Kobayashi, Kanagawa-ken (JP); Tomomi Takata, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,185

(22) Filed: Sep. 5, 2002

(65) Prior Publication Data

US 2004/0002964 A1 Jan. 1, 2004

Related U.S. Application Data

(62) Division of application No. 09/409,056, filed on Sep. 30, 1999.

(30) Foreign Application Priority Data

Sep. 30, 1998 (JP) .......................................... 10-278722
Sep. 30, 1998 (JP) .......................................... 10-278724
Sep. 30, 1998 (JP) .......................................... 10-278728

(51) Int. Cl.[7] ................................................ G06F 17/30
(52) U.S. Cl. ..................... 707/6; 707/3; 707/6; 707/10; 715/513; 706/46; 717/146
(58) Field of Search ................................ 707/1, 2, 3, 4, 707/5, 104.1, 527, 104, 6, 8, 10; 715/527, 513; 706/46; 717/146; 382/224

(56) References Cited

U.S. PATENT DOCUMENTS 4,785,413 A * 11/1988 Atsumi ....................... 715/534
4,799,191 A * 1/1989 Yoshimura .................. 715/533
5,109,439 A * 4/1992 Froessl ....................... 382/305
5,297,039 A * 3/1994 Kanaegami et al. ........... 707/5
5,375,235 A * 12/1994 Berry et al. .................... 707/5
5,572,726 A * 11/1996 Hasuo ........................ 707/200
5,625,767 A * 4/1997 Bartell et al. .................. 707/5
5,751,286 A * 5/1998 Barber et al. .................. 707/6

(List continued on next page.)

OTHER PUBLICATIONS

Wittenburg, T.M., Little, T.D.C., An adaptive document management System for Shared Multimedia Data. Proceedings of the International Conference on Multimedia Computing and Systems, 1994., May 15–19, 1994; pp. 245–254.*

Mukherjea, Sougata et al., "Visualizing World–Wide Web Search Engine Results", Proceedings of the 1999 IEEE International Conference on Information Visualization, Jul. 14–16, 1999, pp. 400–405.*

Yanai, Keiji, "An–Automatic Image–Gathering System for the World–Wide Web by Integration of Keywords and Image Features", Proceedings, Forth International Conference on Computational Intelligence and Multimedia Applications, Oct. 2001, pp. 303–307.*

(List continued on next page.)

*Primary Examiner*—Shahid Alam
(74) *Attorney, Agent, or Firm*—Fitzpatrick, Cella, Harper & Scinto

(57) ABSTRACT

A search request input processing unit holds an input query word in a query word holding unit. An associative word unfolding processing unit acquires associative words in association with the query word held in the query word holding unit with reference to an associative word dictionary. An image content search processing unit using associative words makes a keyword search of image information on the basis of the obtained associative words and the query word. A sensory pattern unfolding processing unit obtains the query word and sensory patterns corresponding to associative words of the query word, and searches image information using feature amounts of the obtained sensory patterns. A search result integration processing unit integrates the search results obtained by the image content word search processing unit and sensory pattern search processing unit.

15 Claims, 22 Drawing Sheets

U.S. PATENT DOCUMENTS

| | | | | | |
|---|---|---|---|---|---|
| 5,757,224 | A | * | 5/1998 | Antone et al. | 327/538 |
| 5,771,738 | A | * | 6/1998 | Ko | 72/391.8 |
| 5,778,368 | A | * | 7/1998 | Hogan et al. | 707/10 |
| 5,832,450 | A | * | 11/1998 | Myers et al. | 705/3 |
| 5,842,206 | A | * | 11/1998 | Sotomayor | 707/5 |
| 5,852,823 | A | * | 12/1998 | De Bonet | 707/6 |
| 5,884,309 | A | * | 3/1999 | Vanechanos, Jr. | 707/10 |
| 5,893,092 | A | * | 4/1999 | Driscoll | 707/5 |
| 5,893,095 | A | * | 4/1999 | Jain et al. | 707/6 |
| 5,945,982 | A | * | 8/1999 | Higashio et al. | 707/3 |
| 5,960,407 | A | * | 9/1999 | Vivona | 705/10 |
| 5,978,768 | A | * | 11/1999 | McGovern et al. | 705/1 |
| 5,983,237 | A | * | 11/1999 | Jain et al. | 707/104.1 |
| 5,987,446 | A | * | 11/1999 | Corey et al. | 707/3 |
| 6,006,224 | A | * | 12/1999 | McComb et al. | 707/5 |
| 6,038,560 | A | * | 3/2000 | Wical | 707/5 |
| 6,078,916 | A | * | 6/2000 | Culliss | 707/5 |
| 6,085,186 | A | * | 7/2000 | Christianson et al. | 707/3 |
| 6,088,692 | A | * | 7/2000 | Driscoll | 707/5 |
| 6,102,969 | A | * | 8/2000 | Christianson et al. | 707/103 R |
| 6,122,628 | A | * | 9/2000 | Castelli et al. | 707/5 |
| 6,122,647 | A | * | 9/2000 | Horowitz et al. | 715/513 |
| 6,175,829 | B1 | * | 1/2001 | Li et al. | 707/3 |
| 6,182,068 | B1 | * | 1/2001 | Culliss | 707/5 |
| 6,226,636 | B1 | * | 5/2001 | Abdel-Mottaleb et al. | 707/4 |
| 6,249,784 | B1 | * | 6/2001 | Macke et al. | 707/3 |
| 6,347,313 | B1 | * | 2/2002 | Ma et al. | 707/3 |
| 6,493,692 | B1 | * | 12/2002 | Kobayashi et al. | 706/46 |
| 6,493,705 | B1 | * | 12/2002 | Kobayashi et al. | 707/3 |
| 6,526,400 | B1 | * | 2/2003 | Takata et al. | 707/3 |
| 6,556,713 | B2 | * | 4/2003 | Kobayashi et al. | 707/3 |

OTHER PUBLICATIONS

Chung–Sheng Li, Mohan, R., Smith, J.R., Multimedia Content desription in the InfoPyramid,. Proceedings of the 1998 IEEE International Conference on Acoustics, Speech and Signal Processing vol. 6, May 12–15, 1998, pp. 3789–3792.*

Hjelsvold, R., Midtstraum, R. Sandsta, O., Searching and browsing a Shared Video Database, Proceedings., International Workshop on Multi–Media Database Management Systems, 1995., Aug. 28–30, 1995, pp. 90–98.*

Mukherjea, Sougata et al., "Visualizing World–Wide Web Search Engine Results", Proceedings of the 1999 IEEE International Conference on Information Visualization, Jul. 14–16, 1999, pp. 400–405.

Yanai, Keiji, "An Automatic Image–Gathering System for the World–Wide Web by Integration of Keywords and Image Features", Proceedings, Fourth International Conference on Computational Intelligence and Multimedia Applications, Oct. 2001, pp. 303–307.

Chung–Sheng Li, Mohan, R., Smith, J.R., "Multimedia Content Description in the InfoPyramid", Proceedings of the 1998 IEEE International Conference on Acoustics; Speech and Signal Processing vol. 6; May 1998; pp. 3789–3792.

Hjelsvold, R., Midtstraum, R., Sandsta, O., "Searching and Browsing a Shared Video Database", Proceedings, International Workshop on Multi–Media Database Management Systems; Aug. 1995; pp. 90–98.

Wittenburg, T.M., Little, T.D.C., "An Adaptive Document Management System for Shared Multimedia Data"; Proceedings of the International Conference on Multimedia Computing and Systems; May 1994; pp. 245–254.

* cited by examiner

FIG. 3

| IMAGE WORD (2150-1) | ASSOCIATIVE WORD (2150-2) | SENSORY PATTERN ID (2150-3) |
|---|---|---|
| REFRESHING | FOREST | 005 |
| REFRESHING | FOREST | 006 |
| REFRESHING | TABLELAND | 007 |
| REFRESHING | BLUE SKY | 012 |
| REFRESHING | BLUE SKY | 015 |
| REFRESHING | SEA | 016 |
| REFRESHING | | 020 |
| NOT REFRESHING | | 001 |
| NOT REFRESHING | | 010 |
| TROPICAL | SEA | 023 |
| TROPICAL | FRUIT | 052 |
| TROPICAL | FRUIT | 053 |
| TROPICAL | ... | ... |
| ... | ... | ... |

FIG. 4

| | |
|---|---|
| IMAGE WORD (2130-1) | R |
| | E |
| | F |
| | R |
| | E |
| | S |
| | H |
| | I |
| | N |
| | G |
| | NULL |
| | ... |
| NUMBER OF SENSORY PATTERNS (2130-2) | 7 |
| STORAGE LOCATION ADDRESS OF PATTERN INFORMATION (2130-3) | |

2130-4

| | |
|---|---|
| SENSORY PATTERN ID (2130-5) | 5 |
| ASSOCIATIVE WORD (2130-6) | F |
| | O |
| | R |
| | E |
| | S |
| | T |
| | NULL |
| | ... |
| SENSORY PATTERN ID | 12 |
| ASSOCIATIVE WORD | B |
| | L |
| | U |
| | E |
| | |
| | S |
| | K |
| | Y |
| | NULL |
| | ... |
| ... | ... |

FIG. 5

SENSORY PATTERN ID (2200-2)

| IMAGE ID (2200-1) | SENSORY PATTERN 1 | SENSORY PATTERN 2 | ... | SENSORY PATTERN m |
|---|---|---|---|---|
| IMAGE 001 | 0.10 (2200-3) | 0.0 | ... | 0.0 |
| IMAGE 002 | 0.98 | 0.72 | ... | 0.0 |
| ⋮ | ⋮ | ⋮ | ... | ⋮ |
| IMAGE n | 0.0 | 0.50 | ... | 0.87 |

FIG. 6

PHYSICAL IMAGE FEATURE ($X_1$ ~ $X_n$)

| | $X_1$ | $X_2$ | $X_3$ | $X_4$ | $X_5$ | $X_6$ | … | Xn |
|---|---|---|---|---|---|---|---|---|
| B1 | x11 | x12 | X13 | X14 | X15 | X16 | | X1n |
| B2 | x21 | x22 | x23 | x24 | x25 | x26 | | x2n |
| B3 | x31 | x32 | x33 | x34 | x35 | x36 | | x3n |
| B4 | x41 | x42 | x43 | x44 | x45 | x46 | | x4n |
| B5 | x51 | x52 | x53 | x54 | x55 | x56 | | x5n |
| ⋮ | | | | | | | | |
| Bm | xm1 | xm2 | xm3 | xm4 | xm5 | xm6 | | xmn |

B1…Bm: REGION OR BLOCK NO.

FIG. 7

CHROMATIC FEATURE AMOUNT (2230-2)

| SENSORY PATTERN ID (2230-1) | COLOR 1 | | | COLOR 2 | | | ... | COLOR m | | |
|---|---|---|---|---|---|---|---|---|---|---|
| | R | G | B | R | G | B | | R | G | B |
| PATTERN 1 | 255 | 0 | 0 | 255 | 255 | 0 | | 0 | 0 | 0 |
| PATTERN 2 | 153 | 153 | 61 | 255 | 255 | 255 | | 161 | 179 | 89 |
| ⋮ | | | | | | | | | | |
| PATTERN n | 102 | 255 | 255 | 255 | 255 | 255 | | 102 | 179 | 255 |

| IMAGE ID | IMAGE FILE PATH |
|---|---|
| ... | ... |
| 1024 | X: ¥SCENE¥123. BMP |
| ... | ... |
| 1563 | X: ¥HUMAN¥078. BMP |
| 1564 | X: ¥HUMAN¥079. BMP |
| 1565 | X: ¥HUMAN¥080. BMP |
| ... | ... |

| IMAGE ID | IMAGE CONTENT WORD |
|---|---|
| ... | ... |
| 1024 | TABLELAND, BLUE SKY, CLOUD, MOUNTAIN |
| 1025 | SKY, SUN; CLOUD |
| 1026 | SKY, SEA, HORIZON |
| ... | ... |

| IMAGE CONTENT WORD | IMAGE ID |
|---|---|
| ... | ... |
| BLUE SKY | 988, 1020, 1024 |
| SEA | 867, 888, 1026, 1347 |
| CLOUD | 991, 1024, 1025, 1078 |
| TABLELAND | 1024 |
| SKY | 777, 778, 1025, 1026 |
| SUN | 1025, 1066 |
| MOUNTAIN | 1024, 1111, 1112, 1113, 1115 |
| ... | ... |

| INDEX WORD | SEARCH PERSPECTIVE | ANTITHETIC CONCEPT | ASSOCIATED WEIGHT | SENSORY PATTERN WEIGHT |
|---|---|---|---|---|
| ... | ... | ... | ... | ... |
| REFRESHING | CHARACTER DESCRIPTION | SHABBY | 8 | 2 |
| REFRESHING | LANDSCAPE | HEAVY | 3 | 7 |
| REFRESHING | TASTE | THICK | 9 | 1 |
| REFRESHING | GENERAL ATMOSPHERE | | 5 | 5 |
| ... | ... | ... | ... | ... |
| MILD | COLOR TONE | SHOWY | 2 | 8 |
| MILD | TASTE | | 9 | 1 |
| MILD | GENERAL ATMOSPHERE | | 5 | 5 |
| ... | ... | ... | ... | ... |
| SIMPLE | GENERAL ATMOSPHERE | URBAN | 5 | 5 |
| SIMPLE | COLOR TONE | SHOWY | 3 | 7 |
| ... | ... | ... | ... | ... |
| SMOOTH | FEEL | SANDY | 7 | 3 |
| SMOOTH | TEXTURE | SANDY | 5 | 5 |
| SMOOTH | GENERAL ATMOSPHERE | SANDY | 6 | 4 |
| ... | ... | ... | ... | ... |

| ASSOCIATIVE ID | INDEX WORD | ASSOCIATIVE WORD | ASSOCIATIVE PERSPECTIVE | ASSOCIATION STRENGTH |
|---|---|---|---|---|
| ... | ... | ... | ... | ... |
| 58790 | REFRESHING | ATHLETE | CHARACTER DESCRIPTION | 6 |
| 58791 | REFRESHING | NICE GUY | CHARACTER DESCRIPTION | 5 |
| 58792 | REFRESHING | SUMMER RESORT | LANDSCAPE | 6 |
| 58793 | REFRESHING | TABLELAND | LANDSCAPE | 7 |
| 58794 | REFRESHING | BLUE SKY | LANDSCAPE | 8 |
| 58795 | REFRESHING | LEMON | TASTE | 6 |
| 58796 | REFRESHING | SODA | TASTE | 4 |
| 58797 | REFRESHING | SHOWER | GENERAL ATMOSPHERE | 5 |
| ... | ... | ... | ... | ... |
| 71238 | MILD | TEA | TASTE | 7 |
| 71239 | MILD | WINE | TASTE | 2 |
| 71240 | MILD | EARTH COLOR | COLOR TONE | 4 |
| ... | ... | ... | ... | ... |
| 126531 | SIMPLE | COUNTRY | GENERAL ATMOSPHERE | 5 |
| 126532 | SIMPLE | LOCAL STYLE COOKING | GENERAL ATMOSPHERE | 5 |
| 126533 | SIMPLE | FOLKCRAFT ARTICLE | GENERAL ATMOSPHERE | 6 |
| 126534 | SIMPLE | SPACE SHUTTLE | GENERAL ATMOSPHERE | −8 |
| 126535 | SIMPLE | SPORT CAR | GENERAL ATMOSPHERE | −8 |
| 126536 | SIMPLE | CHANDELIER | GENERAL ATMOSPHERE | −9 |
| ... | ... | ... | ... | ... |
| 234099 | SMOOTH | VELVETY SKIN | FEEL | 3 |
| 234100 | SMOOTH | VELVET | FEEL | 6 |
| 234101 | SMOOTH | LUSTER | TEXTURE | 5 |
| ... | ... | ... | ... | ... |

FIG. 15

| 2160 | 2161 | 2162 | 2163 | 2164 | 2165 | 2166 | 2167 |
|---|---|---|---|---|---|---|---|
| FOUND IMAGE ID | NUMBER OF MATCHED ASSOCIATIVE WORDS | ASSOCIATIVE WORD ID LIST | ASSOCIATIVE MATCHING LEVEL | NUMBER OF MATCHED SENSORY PATTERNS | SENSORY PATTERN ID LIST | SENSORY PATTERN MATCHING LEVEL | INTEGRATED MATCHING LEVEL |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

FIG. 16

CHROMATIC IMAGE FEATURE AMOUNT

REGION OR BLOCK NO. (B1 ··· Bn)

| | B1 | B2 | B3 | ··· | Bn |
|---|---|---|---|---|---|
| REPRESENTATIVE COLOR | $C_1(R_1, G_1, B_1)$ | $C_2(R_2, G_2, B_2)$ | $C_3(R_3, G_3, B_3)$ | ··· | $C_n(R_n, G_n, B_n)$ |
| FEATURE AMOUNT | c1 | c2 | c3 | ··· | cn |

FIG. 17

BLOCK OR REGION NO. (2220-2)

| IMAGE ID (2220-1) | B1 | | ... | Bm | |
|---|---|---|---|---|---|
| | REPRESENTATIVE COLOR (2220-3) | FEATURE AMOUNT (2220-4) | ... | REPRESENTATIVE COLOR | FEATURE AMOUNT |
| IMAGE 001 | C11 (R11, G11, B11) | c11 | ... | C1m (R1m, G1m, B1m) | c1m |
| IMAGE 002 | C21 (R21, G21, B21) | c21 | ... | C2m (R2m, G2m, B2m) | c2m |
| ⋮ | ⋮ | ⋮ | ... | ⋮ | ⋮ |
| IMAGE n | Cn1 (Rn1, Gn1, Bn1) | cn1 | ... | Cnm (Rnm, Gnm, Bnm) | cnm |

INFORMATION SEARCH APPARATUS AND METHOD, AND COMPUTER READABLE MEMORY

This application is a divisional of application Ser. No. 09/409,056, filed Sep. 30, 1999.

BACKGROUND OF THE INVENTION

The present invention relates to an information search apparatus and method for searching information on the basis of an input query word.

A conventional information search apparatus, which searches multimedia information, e.g., image information, makes a search using data (keywords) derived from subjective evaluation results of one or a plurality of persons for images to be searched, physical image features extracted from images, and the like.

Also, an image search apparatus that obtains a required image by matching a given keyword with that corresponding to an image has been realized. Furthermore, an information search apparatus, which obtains an image, that cannot be obtained by full-word matching with an input keyword, by matching not only the input keyword but also an associated keyword associated with the input keyword with a keyword corresponding to an image, has also been realized. Moreover, an information search apparatus which obtains an image with similar color information by detecting a correspondence between the input keyword and color information using, e.g., color information of images is proposed.

For example, in one scheme, an impression that a person receives upon watching an image, or key information linked with the impression is appended to image information and is used in search. As the key information, words that express impressions evoked by images such as "warm", "cold", and the like, and words that represent objects in drawn images such as "kitty", "sea", "mountain", and the like are appended as keywords. Also, local image feature components on drawn images are subjectively evaluated and are often appended as key information. For example, information that pertains to a color such as "red", "blue", and the like, information that pertains to a shape such as "round", "triangular", "sharp", and the like, and information that pertains to a texture such as "sandy", "smooth", and the like are expressed using words and icons, are appended to images as key information, and are used in search.

In another system, physical image feature amounts are extracted from images, and are used in image search. Image features include local colors painted on images, overall color tones, and shapes, compositions, textures, and the like of objects on drawn images. An image feature amount is extracted from segmented regions or blocks obtained by segmenting the overall image into regions based on color information, or segmenting the image into blocks each having a given area, or is extracted from the entire image. Physical image features include, e.g., color information, density distribution, texture, edge, region, area, position, frequency distribution, and the like of an image.

However, in the prior art, when an image including a keyword that matches the input query word is searched for, images which do not match the search request of the searcher are often obtained. Especially, when an image search is made using an abstract query word such as a "refreshing" image, images found by the search are limited. To solve this problem, a search may be made by unfolding the query word "refreshing" to keywords which are associated with that query word. However, when such scheme is used, images which are not "refreshing" may be mixed in search results.

In place of query words, a query image may be input, and a search may be made using the feature amount of the input image. In this case, a query image that reflects the searcher's will must be prepared, and it is difficult to select a query image, resulting in poor operability.

SUMMARY OF THE INVENTION

The present invention has been made in consideration of the above-mentioned problems, and has as its object to provide an image search method and apparatus which can extract desired information with high precision with respect to an input query word.

In order to achieve the above object, an image search apparatus according to the present invention comprises the following arrangement.

That is, there is provided an information search apparatus for searching information based on an input query word, comprising:

first search means for determining a query keyword on the basis of the query word, and searching information on the basis of the query keyword;

second search means for determining a feature amount of a pattern corresponding to the query word, and searching information on the basis of the feature amount; and integration means for integrating search results obtained by the first and second search means.

In order to achieve the above object, an image search method according to the present invention comprises the following arrangement.

That is, there is provided an information search method for searching information based on an input query word, comprising:

the first search step of determining a query keyword on the basis of the query word, and searching information on the basis of the query keyword;

the second search step of determining a feature amount of a pattern corresponding to the query word, and searching information on the basis of the feature amount; and the integration step of integrating search results obtained in the first and second search steps.

In order to achieve the above object, an image search apparatus according to the present invention comprises the following arrangement.

That is, there is provided an information search apparatus for managing a plurality of kinds of multimedia information, and searching the managed multimedia information for desired multimedia information, comprising:

a content word holding unit for storing the multimedia information, and content words which verbalize concepts expressed in the multimedia information in correspondence with each other;

an associative word dictionary for storing the content words and associative words which are associated with the content words in correspondence with each other;

input means for inputting a query word;

first search means for acquiring an associative word corresponding to the query word input by the input means from the associative word dictionary, and searching multimedia information on the basis of the acquired associative word;

extraction means for extracting a feature amount corresponding to the query word input by the input means;

second search means for searching multimedia information on the basis of the feature amount extracted by the extraction means; and integration means for integrating search results obtained by the first and second search means.

In order to achieve the above object, an image search method according to the present invention comprises the following arrangement.

That is, there is provided an information search method for managing a plurality of kinds of multimedia information, and searching the managed multimedia information for desired multimedia information, comprising:

the storage step of storing on a storage medium a content word holding unit for storing the multimedia information, and content words which verbalize concepts expressed in the multimedia information in correspondence with each other, and an associative word dictionary for storing the content words and associative words which are associated with the content words in correspondence with each other;

the input step of inputting a query word;

the first search step of acquiring an associative word corresponding to the query word input in the input step from the associative word dictionary, and searching multimedia information on the basis of the acquired associative word;

the extraction step of extracting a feature amount corresponding to the query word input in the input step;

the second search step of searching multimedia information on the basis of the feature amount extracted in the extraction step; and the integration step of integrating search results obtained in the first and second search steps.

In order to achieve the above object, a computer readable memory according to the present invention comprises the following arrangement.

That is, there is provided a computer readable memory for storing a program code of an information search process for managing a plurality of kinds of multimedia information, and searching the managed multimedia information for desired multimedia information, comprising:

a program code of the storage step of storing on a storage medium a content word holding unit for storing the multimedia information, and content words which verbalize concepts expressed in the multimedia information in correspondence with each other, and an associative word dictionary for storing the content words and associative words which are associated with the content words in correspondence with each other;

a program code of the input step of inputting a query word;

a program code of the first search step of acquiring an associative word corresponding to the query word input in the input step from the associative word dictionary, and searching multimedia information on the basis of the acquired associative word;

a program code of the extraction step of extracting a feature amount corresponding to the query word input in the input step;

a program code of the second search step of searching multimedia information on the basis of the feature amount extracted in the extraction step; and a program code of the integration step of integrating search results obtained in the first and second search steps.

In order to achieve the above object, an image search apparatus according to the present invention comprises the following arrangement.

That is, there is provided an information search apparatus for managing a plurality of kinds of multimedia information, and searching the managed multimedia information for desired multimedia information, comprising:

a content word holding unit for storing the multimedia information, and content words which verbalize concepts expressed in the multimedia information in correspondence with each other;

an associative word dictionary for storing the content words and associative words which are associated with the content words in correspondence with each other;

input means for inputting a query word;

a concept discrimination dictionary for storing index words corresponding to the query word and search perspectives pertaining to the index words in correspondence with each other;

display means for extracting search perspectives pertaining to an index word corresponding to the query word input by the input means from the concept discrimination dictionary, and displaying the extracted search perspectives;

designation means for designating a desired one of the search perspectives displayed by the display means;

first search means for acquiring an associative word corresponding to the query word input by the input means from the associative word dictionary, and searching multimedia information on the basis of the acquired associative word;

second search means for extracting a feature amount corresponding to the query word input by the input means, and searching multimedia information on the basis of the extracted feature amount; and integration means for integrating search results obtained by the first and second search means on the basis of the search perspective designated by the designation means.

In order to achieve the above object, an image search method according to the present invention comprises the following arrangement.

That is, there is provided an information search method for managing a plurality of kinds of multimedia information, and searching the managed multimedia information for desired multimedia information, comprising:

the input step of inputting a query word;

the storage step of storing on a storage medium a content word holding unit for storing the multimedia information, and content words which verbalize concepts expressed in the multimedia information in correspondence with each other, an associative word dictionary for storing the content words and associative words which are associated with the content words in correspondence with each other, and a concept discrimination dictionary for storing index words corresponding to the query word and search perspectives pertaining to the index words in correspondence with each other;

the display step of extracting search perspectives pertaining to an index word corresponding to the query word input in the input step from the concept discrimination dictionary, and displaying the extracted search perspectives;

the designation step of designating a desired one of the search perspectives displayed in the display step;

the first search step of acquiring an associative word corresponding to the query word input in the input step from the associative word dictionary, and searching multimedia information on the basis of the acquired associative word;

the second search step of extracting a feature amount corresponding to the query word input in the input step, and searching multimedia information on the basis of the extracted feature amount; and the integration step of integrating search results obtained in the first and second search steps on the basis of the search perspective designated in the designation step.

In order to achieve the above object, a computer readable memory according to the present invention comprises the following arrangement.

That is, there is provided a computer readable memory for storing a program code of an information search process for managing a plurality of kinds of multimedia information, and searching the managed multimedia information for desired multimedia information, comprising:

a program code of the input step of inputting a query word;

a program code of the storage step of storing on a storage medium a content word holding unit for storing the multimedia information, and content words which verbalize concepts expressed in the multimedia information in correspondence with each other, an associative word dictionary for storing the content words and associative words which are associated with the content words in correspondence with each other, and a concept discrimination dictionary for storing index words corresponding to the query word and search perspectives pertaining to the index words in correspondence with each other;

a program code of the display step of extracting search perspectives pertaining to an index word corresponding to the query word input in the input step from the concept discrimination dictionary, and displaying the extracted search perspectives;

a program code of the designation step of designating a desired one of the search perspectives displayed in the display step;

a program code of the first search step of acquiring an associative word corresponding to the query word input in the input step from the associative word dictionary, and searching multimedia information on the basis of the acquired associative word;

a program code of the second search step of extracting a feature amount corresponding to the query word input in the input step, and searching multimedia information on the basis of the extracted feature amount; and a program code of the integration step of integrating search results obtained in the first and second search steps on the basis of the search perspective designated in the designation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing the structure of a sensory pattern/associative word correspondence holding unit in the embodiment of the present invention;

FIG. 4 is a table showing the structure of an unfolded sensory pattern holding unit in the embodiment of the present invention;

FIG. 5 is a table showing the structure of a sensory pattern holding unit in the embodiment of the present invention;

FIG. 6 is a table showing an example of image feature amounts in the embodiment of the present invention;

FIG. 7 is a table showing the structure of an image feature amount & sensory pattern holding unit in the embodiment of the present invention;

FIG. 10 is a table showing the structure of an image holding unit in the embodiment of the present invention;

FIG. 11 is a table showing the structure of an image content word holding unit in the embodiment of the present invention;

FIG. 12 is a table showing another example of the structure of an image content word holding unit in the embodiment of the present invention;

FIG. 13 is a table showing the structure of a concept discrimination dictionary in the embodiment of the present invention;

FIG. 14 is a table showing the structure of an associative word dictionary in the embodiment of the present invention;

FIG. 15 is a table showing the structure of a search result holding unit in the embodiment of the present invention;

FIG. 16 is a table showing another example of feature amounts in the embodiment of the present invention;

FIG. 17 is a table showing the structure of an image feature amount holding unit in the embodiment of the present invention;

DESCRIPTION OF THE PREFERRED EMBODIMENTS

The preferred embodiments of the present invention will be described in detail hereinafter with reference to the accompanying drawings.

Figure 1:
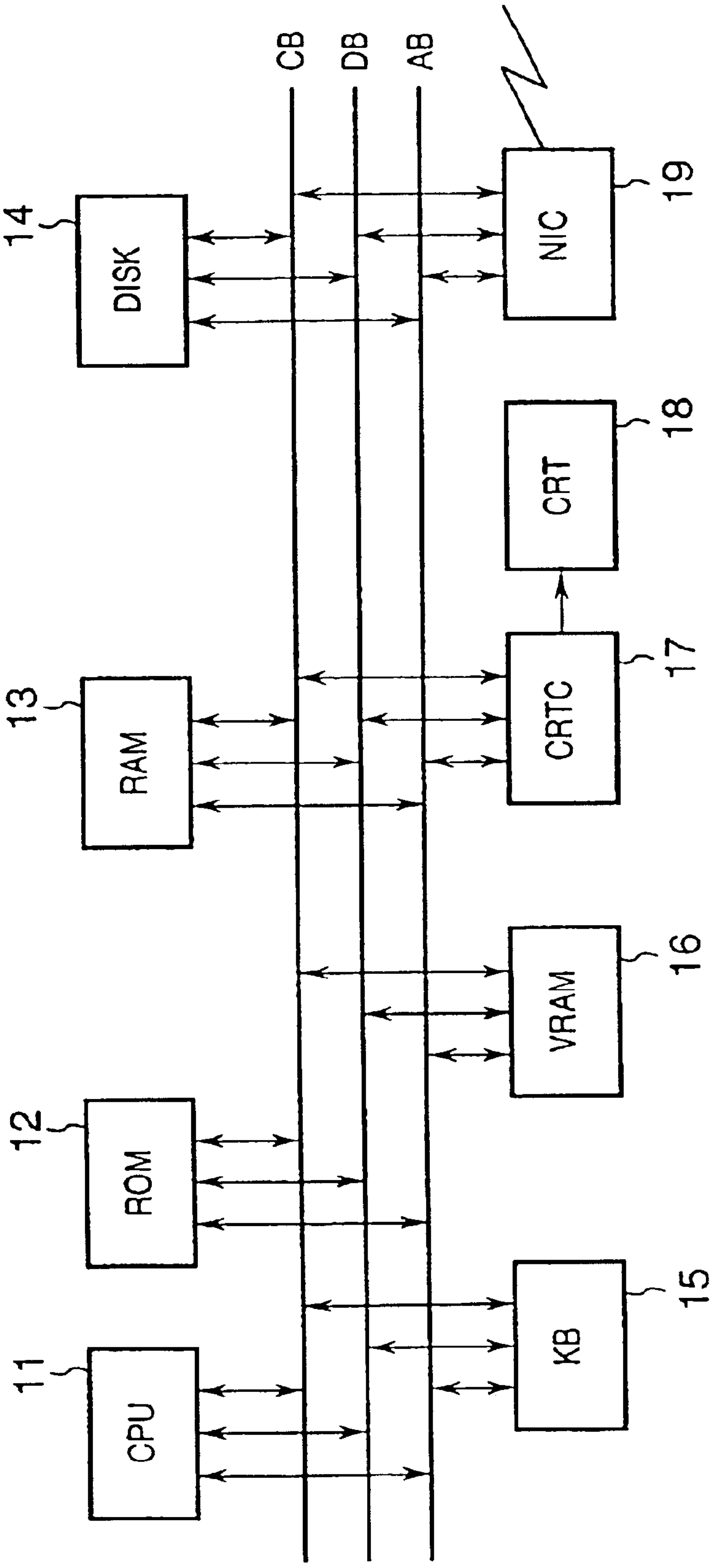
FIG. 1 is a block diagram showing the arrangement of an information search apparatus according to an embodiment of the present invention.

FIG. 1 shows the arrangement of an information search apparatus according to an embodiment of the present invention.

Referring to FIG. 1, reference numeral 11 denotes a microprocessor (CPU), which makes computations, logical decisions, and the like for image information search in accordance with control programs, and controls individual building components connected to an address bus AB, control bus CB, and data bus DB via these buses. The address bus AB transfers an address signal indicating the building component to be controlled by the CPU 11. The control bus CB transfers and applies a control signal for each building component to be controlled by the CPU 11. The data bus DB transfers data among the respective building components.

Reference numeral 12 denotes a read-only memory (ROM), which stores control programs such as a boot processing program executed by the CPU 11 upon starting up the apparatus of this embodiment, a processing program executed in this embodiment, and the like. Reference numeral 13 denotes a rewritable random access memory (RAM) which is configured by 16 bits per word, and is used as a temporary storage of various data from the respective building components. Also, the RAM 13 stores a query word holding unit 202, search perspective holding unit 203, search weight holding unit 204, determined weight holding unit 207, unfolded associative word holding unit 209, unfolded sensory pattern holding unit 213, and search result holding unit 216, which will be described later with reference to FIG. 2.

Reference numeral 14 denotes an external memory (DISK), which stores a concept discrimination dictionary 205, associative word dictionary 211, image word/sensory pattern correspondence holding unit 215, image content word holding unit 219, image holding unit 218, sensory pattern holding unit 220, image feature amount holding unit 222, and image feature amount/sensory pattern correspondence holding unit 223, which will be described later with reference to FIG. 2. Also, the external memory 14 stores programs for respectively implementing processing units, i.e., a search request input processing unit 201, weight determination processing unit 206, associative word unfolding processing unit 208, image content word search unit 210 using associative words, sensory pattern unfolding processing unit 212, sensory pattern search processing unit 214, search result integration processing unit 217, image feature amount extraction processing unit 221, and sensory pattern determination processing unit 224, which will be described later with reference to FIG. 2. As a storage medium for storing these programs, a ROM, floppy disk, CD-ROM, memory card, magnetooptical disk, or the like can be used.

Reference numeral 15 denotes a keyboard (KB) which has alphabet keys, hiragana keys, katakana keys, character symbol input keys for inputting a period, comma, and the like, a search key for instructing a search (a function key on a general keyboard may be used instead), and various function keys such as cursor moving keys for instructing cursor movement, and the like. Also, a pointing device such as a mouse or the like (not shown) may be connected.

Reference numeral 16 denotes a display video memory (VRAM) for storing a pattern of data to be displayed. Reference numeral 17 denotes a CRT controller (CRTC) for displaying the contents stored in the VRAM 16 on a CRT 18. Reference numeral 18 denotes a display device (CRT) using, e.g., a cathode ray tube, or the like. The dot display pattern and cursor display on the CRT 18 are controlled by the CRTC 17. Note that various other displays such as a liquid crystal display, and the like may be used as the display device. Reference numeral 19 denotes a network controller (NIC), which connects the apparatus to a network such as Ethernet or the like.

The information search apparatus constructed by the aforementioned building components operates in accordance with various inputs from the KB 15 and various inputs supplied from the NIC 19 via the network. Upon receiving the input from the KB 15 or NIC 19, an interrupt signal is sent to the CPU 11. Upon receiving the interrupt signal, the CPU 11 reads out various control signals stored in the DISK 14, and executes various kinds of control in accordance with these control signals. Also, the present invention is achieved by supplying a storage medium that stores a program according to the present invention to a system or apparatus, and by reading out and executing program codes stored in the storage medium by a computer of the system or apparatus.

The functional arrangement of the information search apparatus of this embodiment will be explained below with reference to FIG. 2.

Figure 2:
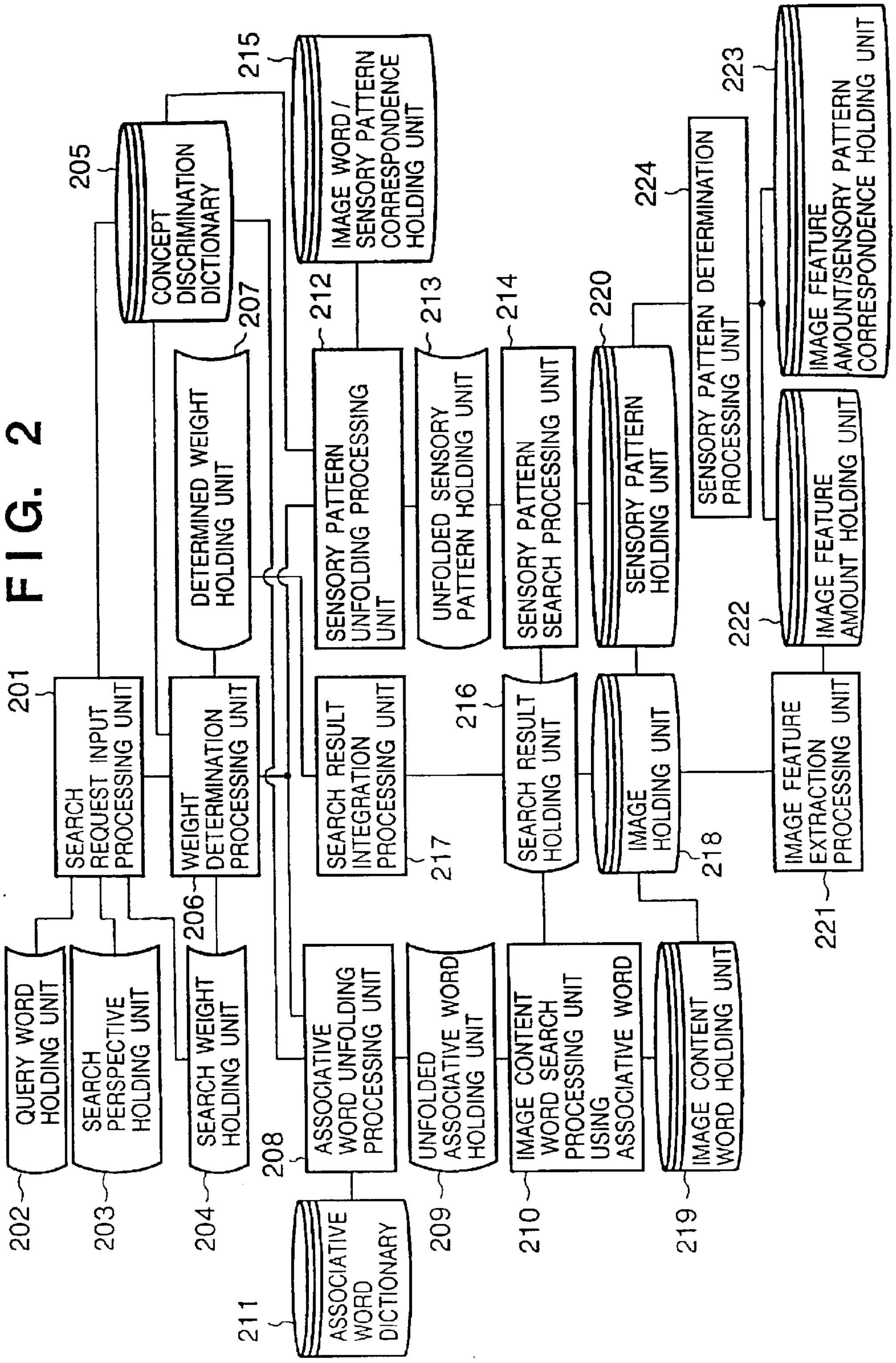
FIG. 2 is a block diagram showing the functional arrangement of the information search apparatus according to the embodiment of the present invention.

FIG. 2 is a block diagram showing the functional arrangement of the information search apparatus according to the embodiment of the present invention.

Referring to FIG. 2, reference numeral 201 denotes a search request input processing unit for inputting query items (query word, search perspective or category, search weight, and the like) that pertain to the information wanted. Reference numeral 202 denotes a query word holding unit for storing a query word input by the search request input processing unit 201. Reference numeral 203 denotes a search perspective holding unit for storing a search perspective input by the search request input processing unit 201. Reference numeral 204 denotes a search weight holding unit for storing a search weight input by the search request input processing unit 201.

Reference numeral 205 denotes a concept discrimination dictionary having a search perspective that pertains to a concept as the information wanted, an antithetic concept having a contrary or antonymous meaning, and two kinds of coefficients for weight discrimination upon searching for a concept. Reference numeral 206 denotes a weight determination processing unit for giving weights (associated weight and sensory pattern weight) indicating the weight balance on associative words (obtained by an associative word unfolding processing unit 208) and sensory patterns (obtained by a sensory pattern unfolding processing unit 212) upon searching using a query word stored in the query word holding unit 202. Reference numeral 207 denotes a determined weight holding unit for holding the search weight determined by the weight determination processing unit 206.

Reference numeral 208 denotes an associative word unfolding processing unit for unfolding the query word stored in the query word holding unit 202 into associative words with reference to an associative word dictionary 211, obtaining an antithetic concept antonymous to that query word from the concept discrimination dictionary 205, and unfolding the antithetic concept into associative words with reference to the associative word dictionary 211. Reference numeral 209 denotes an unfolded associative word holding unit for holding the associative words (including those of the antithetic concept) unfolded by the associative word unfolding processing unit 208. Reference numeral 210 denotes an image content word search processing unit using associative words, which finds image content words, which are stored in an image content word holding unit 219 and match the unfolded associative words, by search with reference to the unfolded associative word holding unit 209.

Reference numeral 211 denotes an associative word dictionary for storing associative words to be unfolded in units of concepts serving as index words in correspondence with associative perspectives. Reference numeral 212 denotes a sensory pattern unfolding processing unit for unfolding the query word stored in the query word holding unit 202 into sensory patterns with reference to an image word/sensory pattern correspondence holding unit 215, obtaining an antithetic concept antonymous to the stored query word from the concept discrimination dictionary 205, and unfolding the obtained antithetic concept into sensory patterns with reference to the image word/sensory pattern correspondence holding unit 215.

Reference numeral 215 denotes an image word/sensory pattern correspondence holding unit for storing image words and sensory patterns in correspondence with each other, i.e., storing image words and sensory pattern IDs corresponding to associative words, which are associated with the image words. Note that FIG. 3 shows a data storage example of the image word/sensory pattern correspondence holding unit 215. The structure of the image word/sensory pattern correspondence holding unit 215 will be described in detail later.

Reference numeral 213 denotes an unfolded sensory pattern holding unit for temporarily storing the sensory patterns unfolded by the sensory pattern unfolding processing unit 212. The unit 213 is stored in the RAM 13. Note that FIG. 4 shows a data storage example of the sensory pattern unfolding processing unit 213. The structure of the sensory pattern unfolding processing unit 213 will be described in detail later.

Reference numeral 214 denotes a sensory pattern search processing unit for finding sensory patterns, which are stored in the sensory pattern holding unit 220 and are similar to the unfolded sensory patterns, by search with reference to the sensory pattern holding unit 220. Reference numeral 217 denotes a search result integration processing unit for integrating the search results of image content words using the associative words, and the search results of sensory patterns stored in a search result holding unit 216, on the basis of the search weights obtained by the weight determination processing unit 206.

Reference numeral 219 denotes an image content word holding unit for verbalizing and storing concepts expressed in image information stored in an image holding unit 218. Reference numeral 218 denotes an image holding unit for storing image information serving as test images. Reference numeral 220 denotes a sensory pattern holding unit for holding sensory patterns obtained from the image information stored in the image holding unit 218, and storing matching levels with respective sensory patterns in units of image IDs each indicating image information. Note that FIG. 5 shows a data storage example of the sensory holding unit 220. The structure of the sensory pattern holding unit 220 will be described in detail later.

Reference numeral 221 denotes an image feature extraction processing unit for extracting physical image feature amounts from image information stored in the image holding unit 218. Physical image feature amounts are visual features or signatures extracted from regions segmented on the basis of color information, blocks each segmented to have a given area, or the entire image. The image feature amount is, e.g., numerical information such as the color distribution or histogram, density distribution, texture, edge, frequency distribution, and the like of an image, and is expressed, as shown in, e.g., FIG. 6. Note that the image feature amounts will be described in detail later.

Reference numeral 222 denotes an image feature amount holding unit for storing the image feature amounts obtained by the image feature amount extraction processing unit 221. Reference numeral 223 denotes an image feature amount/sensory pattern correspondence holding unit for storing image feature amounts and sensory patterns in correspondence with each other, i.e., storing sensory pattern IDs and image feature amounts corresponding to those IDs Note that FIG. 7 shows a data storage example of the image feature amount/sensory pattern correspondence holding unit 223. The image feature amount/sensory pattern correspondence holding unit 223 will be described in detail later.

Reference numeral 224 denotes a sensory pattern determination processing unit for comparing a sensory pattern and image feature amount extracted from image information to obtain their matching level with reference to the image feature amount/sensory pattern correspondence holding unit 223, and registering the matching level in the sensory pattern holding unit 220.

A display example of a search perspective that pertains to search request items input at the search request input processing unit 201 will be explained below with reference to FIG. 8.

Figure 8:
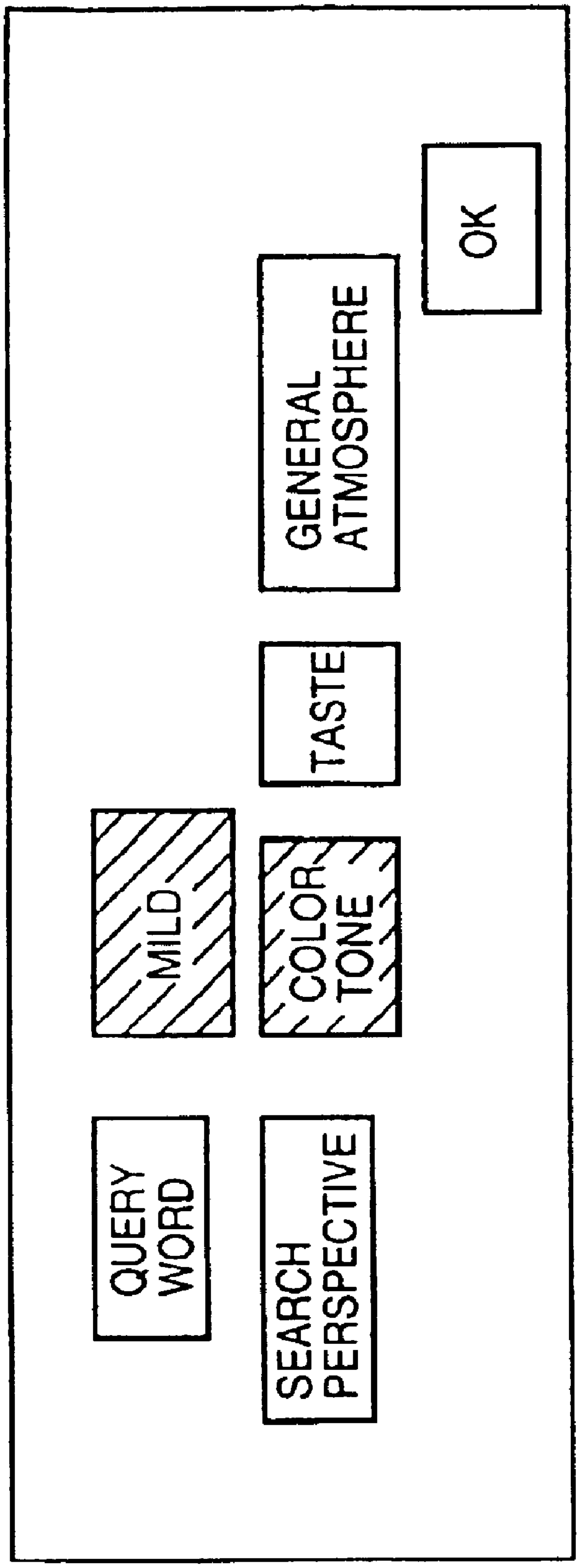
FIG. 8 shows a display example of a search perspective input by a search request input processing unit in the embodiment of the present invention.

FIG. 8 shows a display example of a search perspective input at the search request input processing unit in the embodiment of the present invention.

When a query word is input by operating, e.g., the keyboard 15, the concept discrimination dictionary 205 shown in FIG. 13 is searched using the query word as an index word to extract corresponding search perspectives.

FIG. 8 illustrates that three search perspectives "color tone", "taste", and "general atmosphere" are available in relation to a query word "mild", and hatched "color tone" is selected as the search perspective. When the user presses an OK button in this state, the search perspective "color tone" is selected, and is held in the search perspective holding unit 203. Also, the query word "mild" is held in the query word holding unit 202.

By pressing one of the cursor moving keys on the keyboard 15, the hatching moves from "color tone" to "taste" or "general atmosphere", and the user can designate a desired search perspective or category.

A display example on the control panel when the operator instructs the search weight balance on a search using associative words and a search using sensory patterns in actual search will be explained below with reference to FIG. 9. As described above, a search using associative words and a search using the feature amounts of images (sensory patterns) based on the query word are made, and the search results are integrated. In this integration process, the two search results are weighted. On this control panel, the user can designate a search weight for a search using associative words, and that for a search using sensory patterns. That is, the user can designate the weight balance on a search using associative words and that using sensory patterns in actual search.

Figure 9:
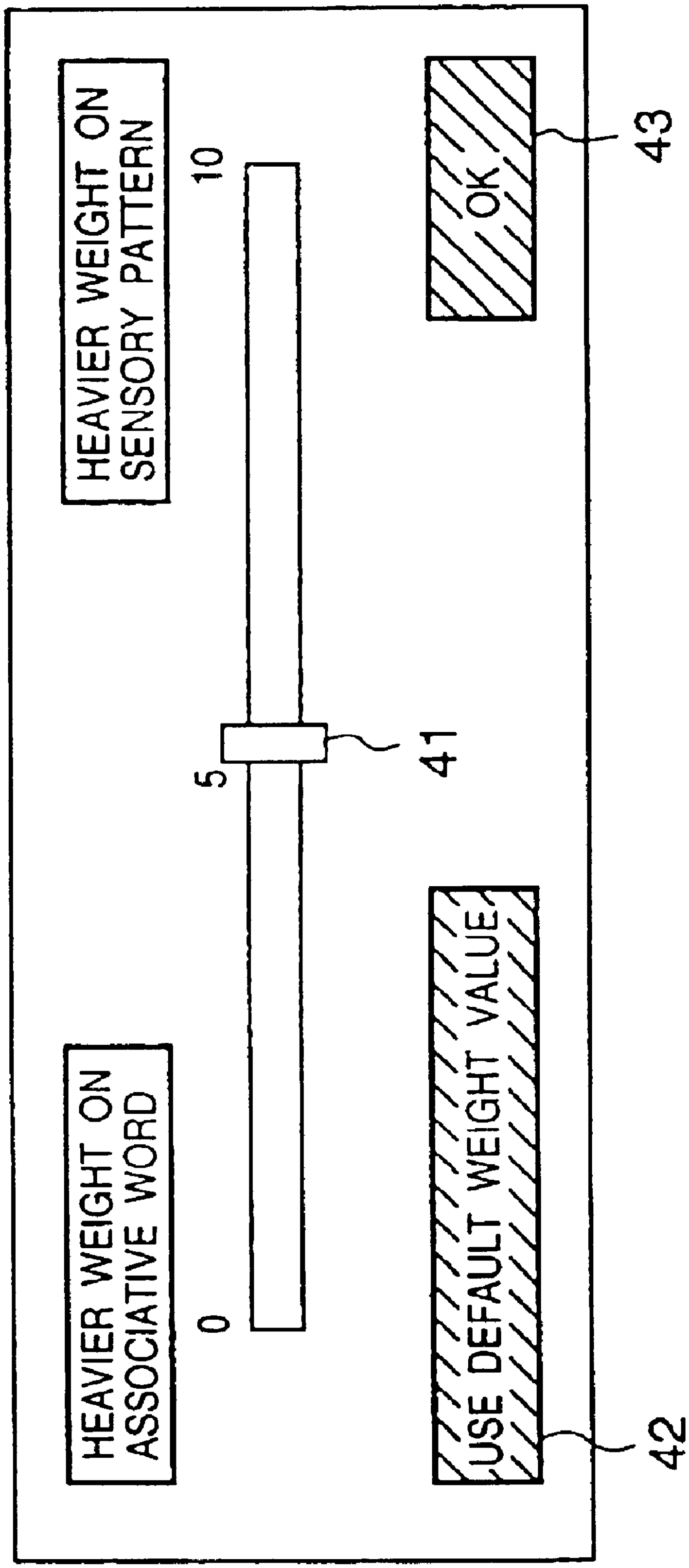
FIG. 9 shows a display example on a control panel upon instructing search weights in the embodiment of the present invention.

FIG. 9 shows a display example of the control panel upon instructing search weights in the embodiment of the present invention.

Referring to FIG. 9, when the user slides a slide button 41 to the left, an instruction that sets a heavier weight on a search using associative words is issued; when he or she slides the slide button 41 to the right, an instruction that sets a heavier weight on a search using sensory patterns is issued. When the user designates search weights using the slide button 41 and then presses an OK button 43, a search weight instruction is issued. A button 42 in the display area is pressed when no search weights are clearly designated, and in such case, a predetermined search weight instruction is issued. Upon depression of the button 42, predetermined weight values (which are obtained from an associated weight 83 and sensory pattern weight 84 in the concept discrimination dictionary 205) are used. The set weights are stored in the search weight holding unit 204. Note that the buttons 41 to 43 on the control panel may be clicked by a pointing device (not shown).

The structure of the image holding unit 218 will be described below using FIG. 10.

FIG. 10 shows the structure of the image holding unit in the embodiment of the present invention.

The image holding unit 218 manages image information by storing image IDs each indicating image information (image files) and image file storage paths each indicating the storage location of image information. Referring to FIG. 10, reference numeral 2180 denotes an image ID which is uniquely assigned to one image file. Reference numeral 2181 denotes a file path which indicates the storage location of an image file corresponding to the image ID in the DISK 14, and corresponds to the directory and file of MS-DOS.

An image file is divided into header and image data fields (not shown in FIG. 10). The header field stores information required for reading data from that image file, and additional information that explains the image contents. As such information, an image format identifier indicating the image format name of the image, file size, image width, height, and depth, the presence/absence of compression, color pallet information, resolution, offset to the storage location of image data, and the like are stored. The image data field stores image data in turn. This embodiment uses the BMP format of Microsoft Corp. as such image format, but other compression formats such as GIF, JPEG, FlashPix, and the like may be used.

The structure of the image content word holding unit 219 will be described below with the aid of FIG. 11.

FIG. 11 shows the structure of the image content word holding unit in the embodiment of the present invention.

The image content word holding unit 219 manages image information by storing the image IDs and image content words in correspondence with each other. Referring to FIG. 11, reference numeral 21900 denotes a field for storing image IDs corresponding to the image IDs 2180 shown in FIG. 10; and 21901, a field for storing image content words that express image files corresponding to the image IDs 21900. The image content word verbalizes an image feature expressed in an image file, and stores a keyword as a character code (e.g., unicode). A plurality of keywords may be stored per image file, and the image content word holding unit 219 is expressed as a list of image content words 21901 using image IDs 21900 as keys. Or, as shown in FIG. 12, the image content word holding unit 219 may be expressed as a list of image IDs 21911 using image content words 21910 as keys.

FIG. 12 shows a table which stores data of the image content word holding unit 219 shown in FIG. 11 as a list of image IDs using image content words as keys. Referring to FIG. 12, all image IDs 21911 that contain the individual words of image content words 21910 as keywords are stored. Note that FIG. 11 shows classification based on image IDs, and FIG. 12 shows classification based on image content words. Therefore, since FIGS. 11 and 12 have the same contents, both the tables need not always be held.

The structure of the concept discrimination dictionary 205 will be described below using FIG. 13.

FIG. 13 shows the structure of the concept discrimination dictionary in the embodiment of the present invention.

As shown in FIG. 13, the concept discrimination dictionary 205 provides information that pertains to a query word serving as a search request, and stores index words 2050 corresponding to query words, search perspectives 2051 associated with index words 2050, antithetic concepts 2052 having meanings contrary to the index words 2050, associated weights 2053 used upon searching the index words 2050, and sensory pattern weights 2054 used upon searching the index words 2050 in correspondence with each other.

The structure of the associative word dictionary 211 will be explained below with reference to FIG. 14.

FIG. 14 shows the structure of the associative word dictionary in the embodiment of the present invention.

The associative word dictionary 211 is composed of associative IDs 2110 each of which assigns a unique number to a set of associative words for each index word 2111, index words 2111 each serving as a start point of association, associative words 2112 evoked by the index words 2111, associative perspectives 2113 which are relevant to associations of the associative words 2112, and association strengths 2114 each indicating the strength of association between each pair of index word 2111 and associative word 2112.

The association strength 2114 assumes an absolute value ranging from 0 to 10, and its sign indicates direction of association of the associative word. More specifically, when the association strength is a positive value, it indicates a stronger associative relationship (higher bilateral association) as the association strength value is larger; when the association strength is a negative value, it indicates a harder associative relationship as the association strength value is larger. For example, an associative word "folkcraft article" corresponding to an index word "simple" in associative data with the associative ID=126533 can be associated with strength "6", but an associative word "chandelier" in associative data with the associative ID=126536 is hardly associated with strength "9" since its association strength is a negative value.

The structure of the search result holding unit 216 will be described below with reference to FIG. 15.

FIG. 15 shows the structure of the search result holding unit in the embodiment of the present invention.

The search result holding unit 216 stores image IDs which are found by searches of the image content word search processing unit 210 using associative words and the sensory pattern search processing unit 214. Referring to FIG. 15, reference numeral 2160 denotes a field for storing image IDs found by search; 2161, a field for storing the number of matched associative words with positive association strengths by the image content word search processing unit 217 using associative words; and 2162, a field for storing a list a maximum of 20 associative word IDs 2110 of matched associative words in the associative word dictionary 211. When the number 2161 of matched associative words is zero, the associative ID 2162 is filled with NULL code. Reference numeral 2163 denotes a field for storing the search matching levels of associative words with respect to the image IDs 2160. When the number 2161 of matched associative words is zero, the associative matching level 2163 stores zero.

Reference numeral 2164 denotes a field for storing the number of sensory patterns with highest similarity, which are found by search by the sensory pattern search processing unit 223; and 2165, a field for staring a list of a maximum of 20 sensory pattern IDs of matched sensory patterns When the number 2164 of matched sensory patterns is zero, the sensory pattern ID 2165 is filled with NULL code. Reference numeral 2166 denotes a field for storing the search matching level of a sensory pattern search with respect to the image ID

2160. When the number 2164 of matched sensory patterns is zero, the sensory pattern matching level 2166 stores zero. Reference numeral 2167 denotes a field for storing the matching level (obtained by the search result integration processing unit 217) of the image ID 2160 with respect to the search request, which is calculated using the associative matching level 2163 and sensory pattern matching level 2166 as parameters.

The structure of the above-mentioned unfolded sensory pattern holding unit 213 will be described below with reference to FIG. 4.

Referring to FIG. 4, reference numeral 2130-1 denotes an image word as an unfolding source from which this sensory pattern has evolved upon unfolding, and the same image word as that in the query word holding unit 202 is stored, In this embodiment, a character string "refreshing" is stored, and ends with NULL code. Reference numeral 2130-2 denotes the number of sensory patterns obtained by unfolding the image word 2130-1 with reference to the image word/sensory pattern correspondence holding unit 215. For example, when the contents of the image word/sensory pattern correspondence holding unit 215 are as shown in FIG. 4, the number of sensory patterns unfolded from the image word "refreshing" is 7. Reference numeral 2130-3 denotes; an address indicating the storage location area of data obtained by actually unfolding the image word "refreshing". The address 2130-3 is linked with unfolded data 2130-4.

Reference numeral 2130-4 denotes unfolded data actually unfolded from "refreshing", and sets of associative words and sensory patterns corresponding to the number 2130-2 of sensory patterns are stored here. In this embodiment, seven sets of associative words and sensory patterns are stored. Reference numeral 2130-5 denotes a sensory pattern ID corresponding to the image word "refreshing" and an associative word "forest" of "refreshing" In this embodiment, "5" is stored. Reference numeral 2130-6 denotes an associative word of the image word "refreshing". In this embodiment, a character string "forest" is stored, and ends with NULL code.

The structure of the aforementioned image word/sensory pattern correspondence holding unit 215 will be described in detail below using FIG. 3.

Referring to FIG. 3, reference numeral 2150-1 denotes an image word serving as an unfolding source of this sensory pattern. In this embodiment, character strings "refreshing" "tropical", and the like are stored, and end with NULL code. Reference numeral 2150-2 denotes an associative word unfolded from the image lord 2150-1. In this embodiment, associative words "forest", "tableland", "blue sky", and the like are stored in correspondence with "refreshing", and these character strings end with NULL code. When no character string is stored in this field, i.e., NULL code alone is stored, this sensory pattern applies to all image words "refreshing"; no specific associative word has been designated.

Reference numeral 2150-3 denotes a sensory pattern ID corresponding to the image word 2150-1 and associative word 2150-2. In this embodiment, "005" and "006" are stored as sensory pattern IDs corresponding to the image word "refreshing" and its associative word "forest". Also, sensory patterns for "not refreshing" as an antithetic concept of "refreshing" are stored. In this; embodiment, for "not refreshing", no associative words are registered and "001" and "010" are registered as sensory pattern IDs.

The structure of the above-mentioned sensory pattern holding unit 220 will be described in detail bellow using FIG. 5.

Referring to FIG. 5 reference numeral 2200-1 denotes an image ID for identifying an image to be registered The image IDs use the same ones as those stored in the image holding unit 218, and uniquely define images in this system. A field 2200-2 stores sensory pattern IDs. In this embodiment, since the matching levels between each image and all sensory patterns stored in the image feature amount/sensory pattern correspondence holding unit 223 are calculated, all the sensory pattern IDs are stored. Reference numeral 2200-3 denotes a numerical value indicating the matching level between each image and sensory pattern. The matching level assumes a value ranging from 0 to 1; 0indicates the image does not match the sensory pattern at all, and the matching level becomes higher as it is closer to 1. For example, the matching level between image with the image ID=001 and sensory pattern 1 is 0.10, and the matching level between that image and sensory pattern 2 is 0.

The aforementioned image feature amounts will be explained in detail below with reference to FIG. 6.

In FIG. 6, X1, X2, X3, . . . , Xn represent image features extracted from one image, B1, B2, . . . , Bm represent regions/blocks from which image feature amounts are extracted, and x11 to xmn represent image feature amounts extracted from the individual regions/blocks. That is, feature amounts that pertain to physical, image features X1 to Xn are obtained in units of regions/blocks. FIG. 16 exemplifies a case wherein chromatic image feature amounts are extracted, i.e., representative colors are extracted in units of image regions or blocks. Referring to FIG. 16, a physical image feature is expressed by "representative color" and "feature amount", representative colors extracted from regions/blocks B1, B2, . . . , Bn are C1(R1, G1, B1, C2(R2, G2, B2), . . . , Cn(Rn, Gn, Bn), and their image feature amounts are c1 to cn.

The structure of the image feature amount holding unit. 222 will be described below using FIG. 17.

FIG. 17 shows the structure of the image feature amount holding unit in the embodiment of the present invention.

Referring to FIG. 17, reference numeral 2220-1 denotes an image ID for identifying an image to be registered, The image IDs use the same ones as those stored in the image holding unit 218. Reference numeral 2220-2 denotes a block or region number from which an image feature amount is extracted. In this embodiment, B1, B2, . . . , Bm represent the region/block numbers. Reference numeral 2220-3 denotes information (in this embodiment a representative color is used) indicating an image feature extracted from each of the regions/blocks B1, B2, . . . , Bm (2220-2). This embodiment exemplifies a case wherein chromatic image features are extracted, and a plurality of pieces of information C11(R11, G11, B11), . . . , Cn1(Rn1, Gn1, Bn1) indicating colors are stored. Reference numeral 2220-4 denotes image feature amounts of image features extracted from the individual regions/blocks. In this embodiment, c11, . . . cn1 are stored as the image feature amounts of image features C11(R11, G11, B11), . . . Cn1 (Rn1, Gn1, Bn1).

The structure of the image feature amount/sensory pattern (correspondence holding unit 223 will be described in detail below using FIG. 7.

Referring to FIG. 7, reference numeral 2230-1 denotes a sensory pattern ID, which uniquely identifies a sensors pattern. Reference numeral 2230-2 denotes an image feature amount corresponding to each sensory pattern ID. In this embodiment, a sensory pattern is expressed by a chromatic image feature amount, and a combination of color components (values in a color space such as RGB, HVC, or the like) corresponding to each sensory pattern ID is stored. In this embodiment, values in the RGB color space are registered as color components. The RGB values assume integers ranging from 0 to 255, and a maximum of m colors correspond to each sensory pattern ID.

The sensory pattern determination processing unit 244 calculates the matching levels between each of image data registered in the image holding unit 218 and the respective sensory patterns using the aforementioned image feature amount holding unit 222 and image feature amount/sensory pattern correspondence holding unit 223, and registers them in the sensory pattern holding unit 220 (to be described later in step S2207 in FIG. 22).

The processes executed in this embodiment will be described below using FIG. 18.

Figure 18:
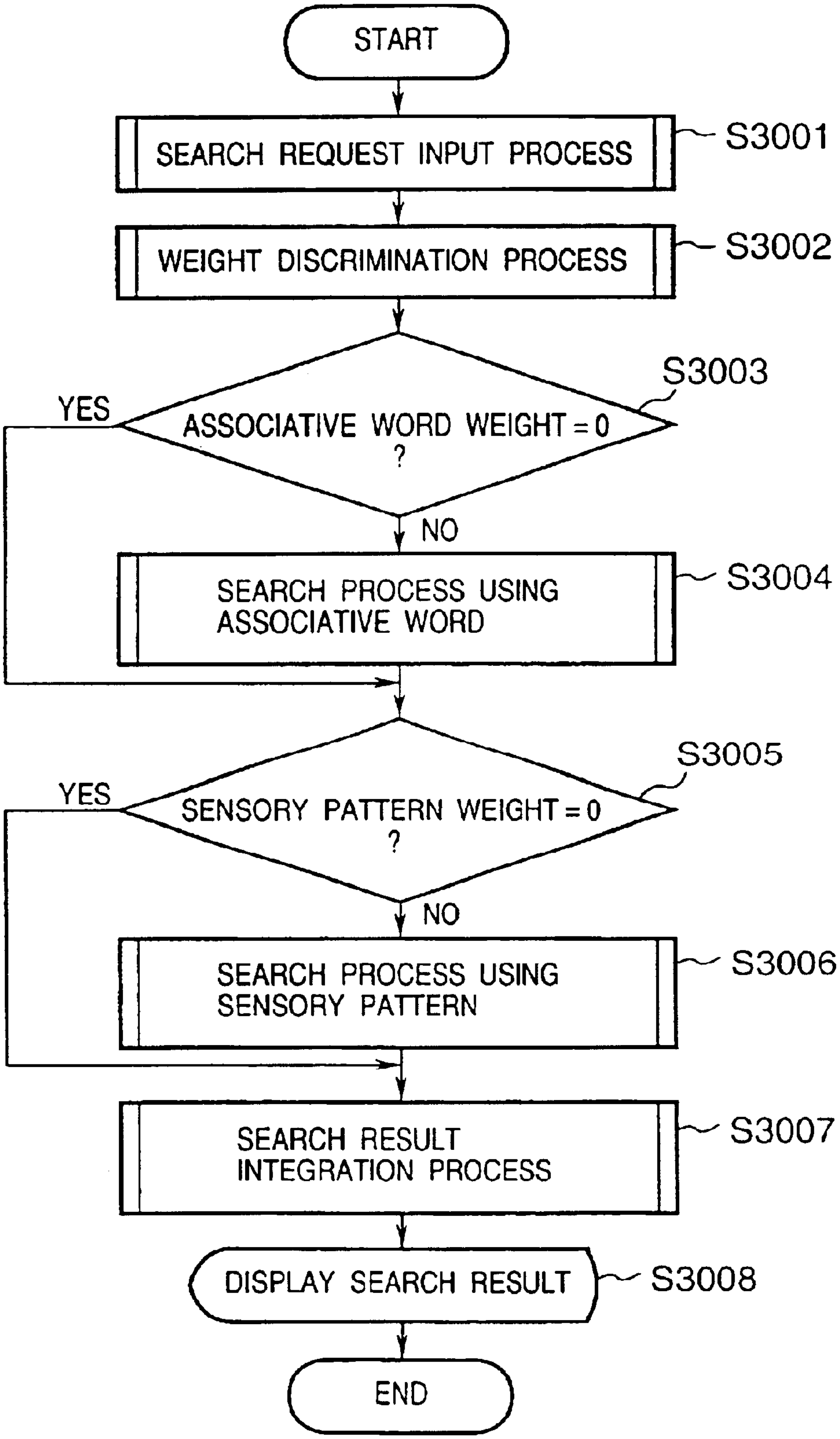
FIG. 18 is a flow chart showing processes executed in the embodiment of the present invention.

FIG. 18 is a flow chart showing the processes executed in the embodiment of the present invention.

In step S3001 a processing module that implements the operation of the search request input processing unit 201 in FIG. 2 executes a search request input process. Notes that the search request input process will be explained in detail later. If it is determined with reference to the contents of the search weight holding unit 204 in step S3002 that search weights are designated, the designated values are stored in the determined weight holding unit 207. On the other hand, if no search weights are designated, index words 2050 are searched for a query word stored in the query word holding unit 202 with reference to the concept discrimination dictionary 205 so as to read out a Corresponding associated weight 2053 and sensory pattern weight 2054, and the readout weights are stored in the determined weight holding unit 207. If there is no index word 2050 that is relevant to the contents of the query word holding unit 202, a default value "5" is stored as both the associated and sensory pattern weights in the determined weight holding unit 207.

It is checked with reference to the determined weight holding unit 207 in step S3003 if the associated weight is zero. If the associated weight is zero (YES in step S3003), the flow advances to step S3005. On the other hand, if the associated weight is not zero (NO in step S3003) the flow advances to step S3004.

In step S3004, a processing module that implements the operations of the associative word unfolding processing unit 208 and image content word search processing unit 210 using associative words in FIG. 2 executes a search process using associative words. Note that the search process using associative words will be described in detail later.

It is checked with reference to the determined weight holding unit 207 in step S3005 if the sensory pattern weight is zero. If the sensory pattern weight is zero (YES in step S3005), the flow advances to step S3007. On the other hand, if the sensory pattern weight is not zero (NO in step S3005), the flow advances to step S3006.

In step S3006 a processing module that implements the operations of the sensory pattern unfolding processing unit 212 and sensory pattern search processing unit 214 in FIG. 2 executes a search process sing sensory patterns. Note that the search process using sensory patterns will be described in detail later In step S3007, a processing module that implements the operation of the search result integration processing unit 217 executes a search result integration process. Note that the search result integration process will be described in detail later.

In step S3008, image files corresponding to image IDs stored in the search result holding unit 216 as search results obtained in step S3007 are read out from the image holding unit 218, and are displayed. Note that this process is a known one which is prevalent in image search apparatuses of the same type.

The search request input process in step S3001 will bee described in detail below with reference to FIG. 19.

Figure 19:
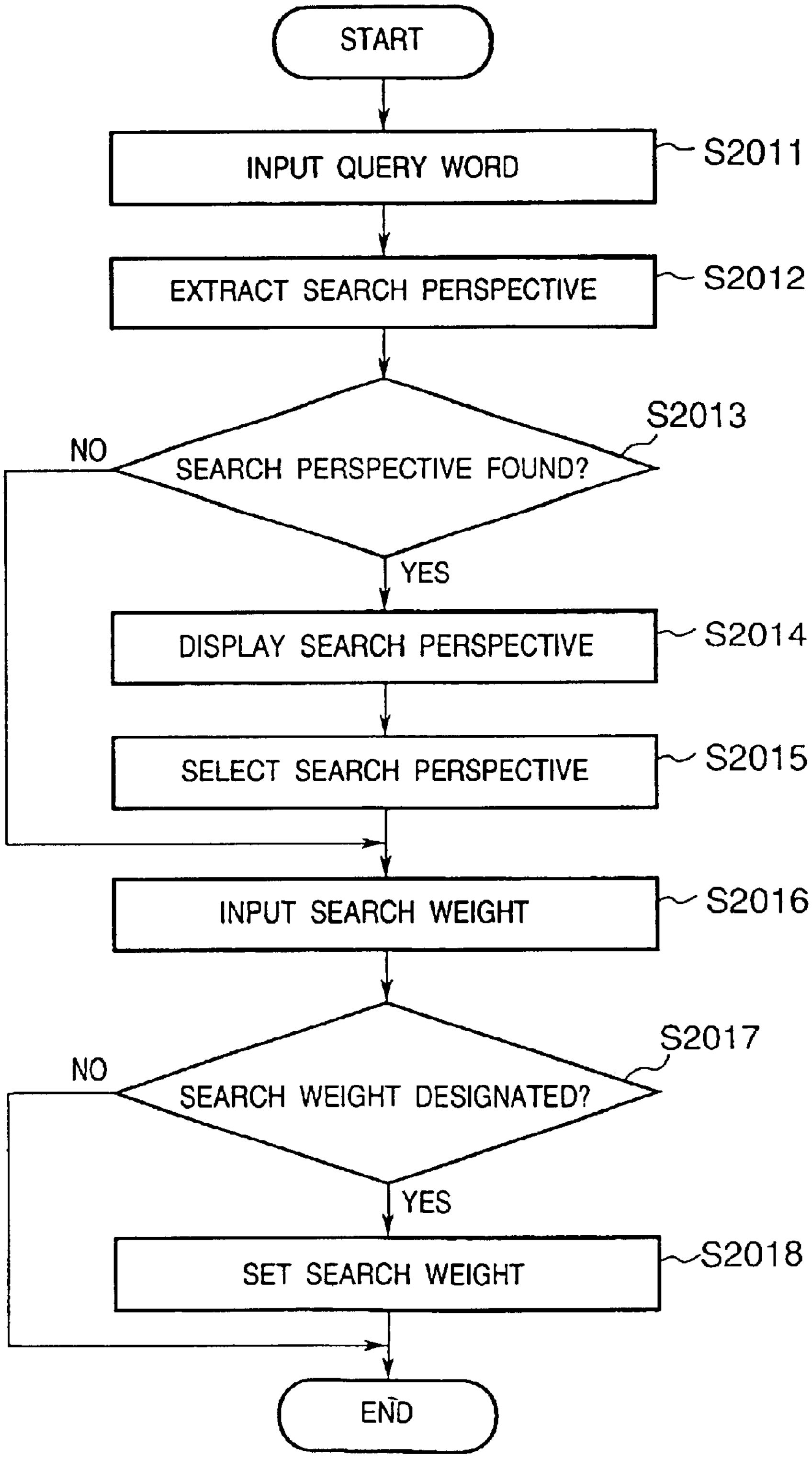
FIG. 19 is a flow chart showing details of a search request input process in the embodiment of the present invention.

FIG. 19 is a flow chart showing the details of the search request input process in the embodiment of the present invention.

In step S2011, a query word serving as a search request is input. The query word input is attained by storing a character code input at the KB 15 in the query word holding unit 202 on the RAM 13. In step S2012, search perspectives that are relevant to the query word stored in the query word holding unit 202 are extracted from the concept discrimination dictionary 205. That is, all search perspectives 2051 corresponding to index words 2050, which match the query word in the query word holding unit 202, are extracted. For example, when the query word is "mild", three search perspectives "color tone", "taste", and "general atmosphere", can be obtained.

It is checked in step S2013 if a search perspective or perspectives is or are found. If a search perspective or perspectives is or are found (YES in step S2013), the flow advances to step S2014. On the other hand, if no search perspective is found (NO in step S2013), the flow advances to step S2016.

In step S2014, the window for designating the search perspective described above with reference to FIG. 8 is displayed. In step S2015, the user selects a desired one of the search perspectives displayed on the window The selected search perspective is stored in the search perspective holding unit 203.

In step S2016, the user inputs search weights which determine the weight balance on a search using associative words and a search using sensory pattern in actual search in relation to the search process in response to the search request. That is, the user operates the slide button 41 on the control panel shown in FIG. 9 to designate the weight ratios on associative words and sensory patterns. When the user does not designate any search weights, he or she presses the button 42 in the display area on the control panel shown in FIG. 9 to designate default values of the search weights.

It is checked in step S2017 if search weights are designated. If search weights are not designated (NO in step S2017), i.e., if the default values of the search weights are designated, the processing ends. On the other hand, if search weights are designated (YES in step S2017), the designated associative word and sensory pattern weights are stored in the search weight holding unit: 204 in step S2018, thus ending the processing.

The search process using associative words in step S3004 will be described in detail below with reference to the flow chart in FIG. 20.

Figure 20:
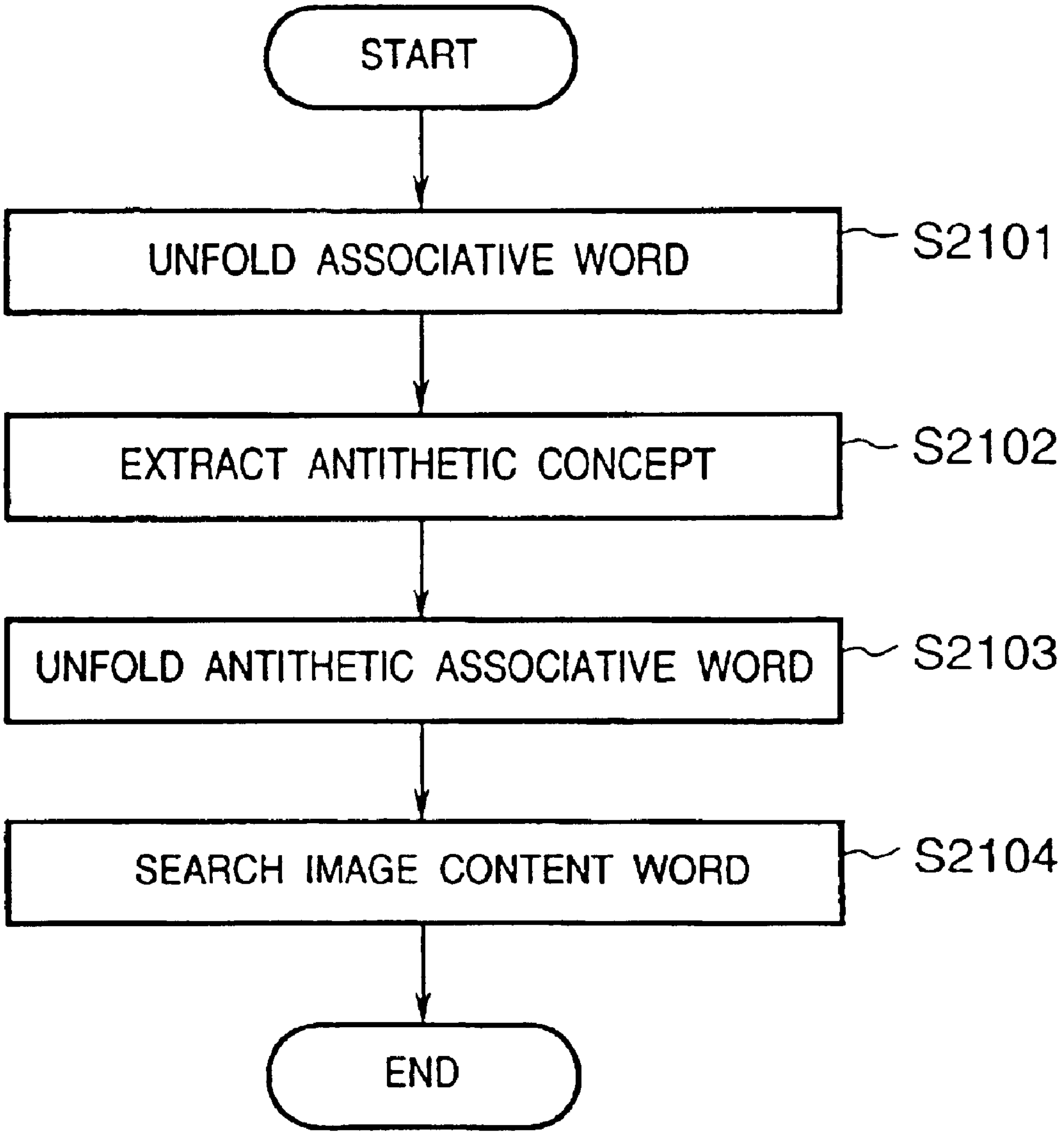
FIG. 20 is a flow chart showing details of a search process using an associative word in the embodiment of the present invention.

FIG. 20 is a flow chart showing the details of the search process using associative words in the embodiment of the present invention.

In step S2101, associative word data corresponding to index words 2111 in the associative word cautionary 211 that match the query word stored in the query word holding unit 202, are found by search. That is the associative word dictionary 211 is searched for index words 2150-2 (FIG. 3), which match the query word, and registered associative word data are extracted. If index words that match the query word are found, all their associative IDs are stored in the unfolded associative word holding unit 209.

In step S2102, the concept discrimination dictionary 205 is searched, and if an index word that matches the query word in the query word holding unit 202 ice found, a search perspective 2051 corresponding to that index word is extracted. The extracted search perspective 2051 is compared with that stored in the search perspective holding unit 203, and if they match, an antithetic concept 2052 corresponding to this index word is extracted. On the other hand, if the two search perspectives do not match, data in which the query weird matches an index word continues to be searched for, and if no antithetic concept whose search perspective matches the index word is found finally, the flow advances to step S2103.

In step S2103, the associative word dictionary 211 is searched for associative words having an index word, which matches the antithetic concept found in step S2102. If an index word that matches the antithetic concept is found, their associative IDs are stored in the unfolded associative word holding unit 209 by appending a status code indicating an antithetic concept thereto.

In step S2104, associative words are extracted based on the associative IDs stored in the unfolded associative word holding unit 209, and the image content word holding unit 219 is searched for image content words that match the associative words. The search results are stored in the search result holding unit 216. More specifically, the associative IDs are extracted from the unfolded associative word holding unit 209, and corresponding associative data are extracted with reference to the associative word dictionary 211. Next, the association strengths 2114 of the extracted associative data are extracted, and if a status code indicating an antithetic concept is appended to a given associative ID extracted from the unfolded associative word holding unit 209, the sign of the association strength is inverted to indicate a negative association strength However, if the association strength is already a negative value, that associative data is discarded, and the next associative data is checked. In this manner, the obtained association strengths are set in a work memory ASCF (not shown) on the RAM 13.

Then, an associative perspective corresponding to each associative ID is extracted, and is compared with that stored in the search perspective holding unit 203. If the two perspectives match, a predetermined value at is set in a work memory VPF (not shown) on the RAM 13. If they do not match, a value $\alpha \times 0.1$ is set in the work memory VPF on the RAM 13.

Finally, the image content word holding unit 219 is searched for image content words that match associative words corresponding to the associative IDs. If an image content word is found, its image ID 21911 is set in the found image ID 2160 in the search result holding unit 216, "1" is set in the number 2161 of matched associative words, and the found associative ID is set in the associative word ID 2162. Then, a value obtained by multiplying the value in the work memories ASCF and VPF on the RAM 13 by a predetermined score $\beta$ based on associative word matching is stored as an associative matching level in the associative matching level 2163. If an identical image ID has already been stored, the value of the number 2161 of matched associative words is incremented by 1, a new associative word ID is added to the associative word ID 2162, and the calculated associative matching level is added to the stored associative matching level 2163 to update its value.

The search process using sensory patterns in step S3006 and the search result integration process in step S3007 will be described in detail below with reference to FIG. 21.

Figure 21:
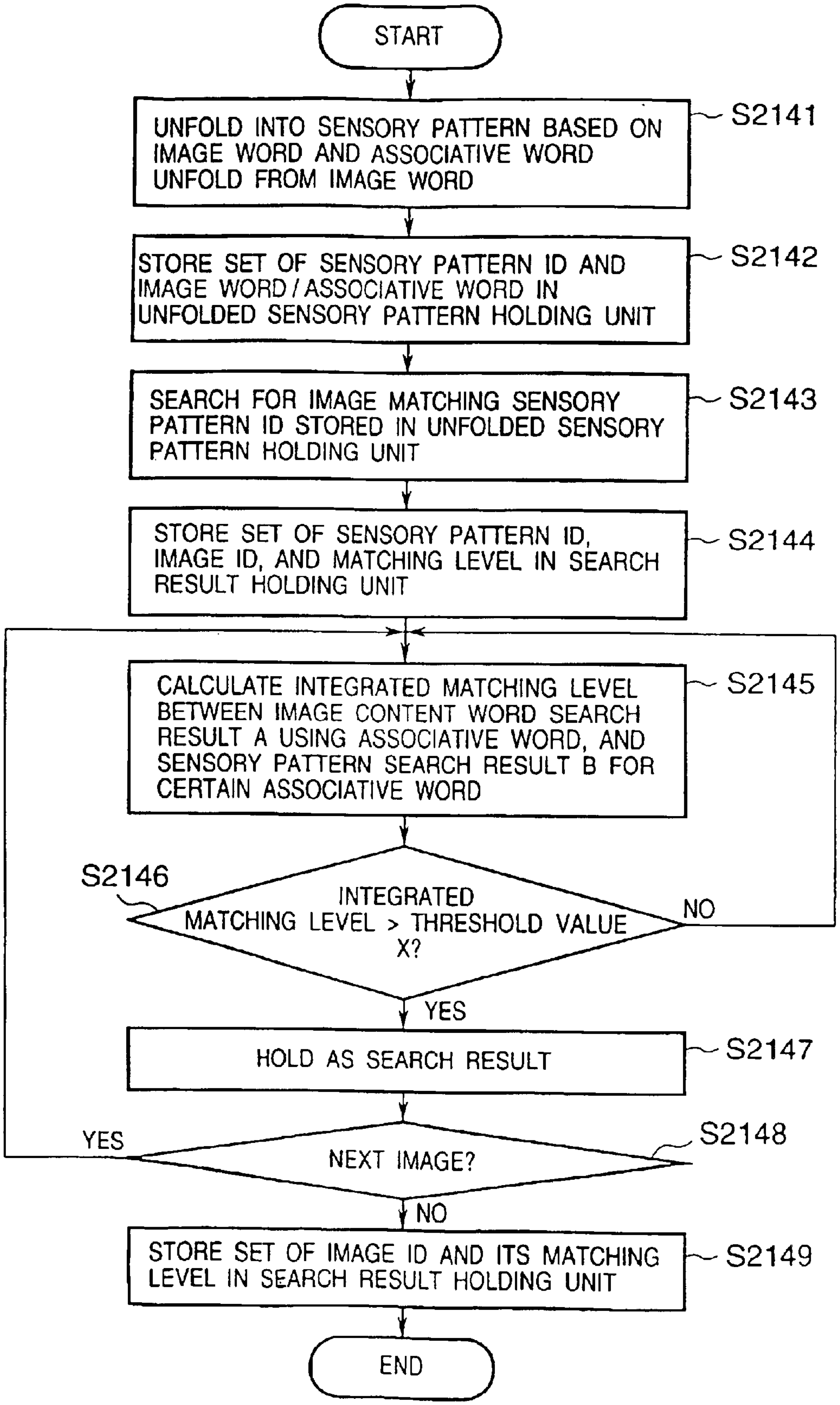
FIG. 21 is a flow chart showing details of a search process using a sensory pattern in step S3006 and a search result combining process in step S3007 in the embodiment of the present invention.

FIG. 21 is a flow chart showing the search process using sensory patterns in step S3006 and the search result integration process in step S3007 in the embodiment of the present invention.

These processes are controlled in accordance with a processing program stored in the DISK 14.

The user inputs a search request for searching images at the search request input processing unit 201. The search request contains one or a plurality of query words, search perspectives, and the like. The query word input in this embodiment is an abstract image word that expresses impressions of images such as "refreshing" "warm", and the like. In this embodiment, assume that an image word "refreshing" is stored.

Steps S2141 and S2142 are implemented by the sensory pattern unfolding processing unit 212. In step S2141, the image word held in the query word holding unit 202 is unfolded into sensory patterns with reference to the image word/sensory pattern correspondence holding unit 215. In this embodiment, the query word holding unit 202 stores the image word "refreshing" the unfolded associative word holding unit 209 holds associative words "forest", "tableland", "blue sky", and the like unfolded from "refreshing", and the image word is unfolded into corresponding sensory pattern IDs with reference to the image word/sensory pattern correspondence holding unit 215. For example, sensory pattern IDs "005" and "006" corresponding to image word "refreshing"—associative word "forest" are acquired, and a sensory pattern ID "007" corresponding to image word "refreshing"—associative word "tableland" is acquired.

In step S2142, the sets of unfolded sensory pattern IDs and image words/associative words are stored in the unfolded sensory pattern holding unit 213. The data storage example at that time is as shown in FIG. 4.

Steps S2143 and S2144 are implemented by the sensory pattern search processing unit 214. In step S2143, all image IDs of images having matching levels larger than zero with respect to the sensory pattern IDs stored in the unfolded sensory pattern holding unit 213 are acquired. This process is done for all the sensory patterns stored in the unfolded sensory pattern holding unit 213. Note that the sensory pattern search processing unit 214 acquires image IDs having matching levels larger than zero with respect to the sensory pattern IDs respectively unfolded from the query word and antithetic concept.

In step S2144, sets of acquired sensory pattern IDs, image IDs, and their matching levels are stored in the search result holding unit 216.

Steps S2145 to S2149 are implemented by the search result integration processing unit 217. In step S2145, two sets of search results, i.e., the image content word search results using associative words and sensory pattern search results, which are stored in the search result holding unit 216, are integrated into one set of search results on the basis of the search weights stored in the determined weight holding unit with reference to those search results. When the sensory pattern search results include a sensory pattern based on the antithetic concept to the query word, the corresponding image is excluded from the integrated results. Or the sensory pattern matching level of an image including a sensory pattern of the antithetic concept may be lowered upon integration. In this process, a method of obtaining common elements of two sets of search results in units of associative words (ANDing search results), a method of calculating integrated matching levels based on the weights on the searches, and selecting appropriate search results in descending order of integrated matching levels, and the like are available. In this embodiment, the method of calculating the integrated matching levels will be exemplified below.

Let A be the associative matching level of an image hat matches an associative word "forest" stored in the search result holding unit 216, to be the sensory matching level of an image that matches the sensory pattern ID "005" corresponding to the associative word forest, and w1 and w2 (w1+w2=1) be the search weights stored in the determined weight holding unit 297. Then, the integrated matching level is given by:

$$\text{Integrated matching level}=w1*A+w2*B$$

or $$\text{Integrated matching level}=(w1*A^2+w2*B^2)^{1/2}$$

The integrated matching levels of all sensory patterns of all associative words are calculated. When one image ID has matching levels larger than zero with respect to a plurality of sensory pattern IDs, a plurality of integrated matching levels are obtained for one image. However, in this case, an image with the highest integrated matching level is adopted as a search result. This process is done for all images corresponding to either set of search results larger than zero, and images whose integrated matching levels are Larger than a predetermined threshold value X are selected as integrated search results.

That is, it is checked in step S2146 if the integrated matching level of an image to be processed is larger than the threshold value X. If the integrated matching level is equal to or smaller than the threshold value X (NO in step S2146), the flow returns to step S2145. On the other hand, if the integrated matching level is larger than the threshold value X (YES in step S2146), the flow advances to step S2147. In step S2147, the image ID of the image to be processed is held in the search result holding unit 216 as a search result. It, is checked in step S2148 if the next image to be processed still remains. If the next image still remains (YES in step S2148), the flow returns, too step S2145. On the other hand, if no images remain (NO in step S2148) the flow advances to step S2149.

In step S2149 the sets of image IDs and their integrated matching levels are stored in the search result holding unit 216, thus ending the processing.

An image registration process for registering test images will be explained below with reference to FIG. 22.

Figure 22:
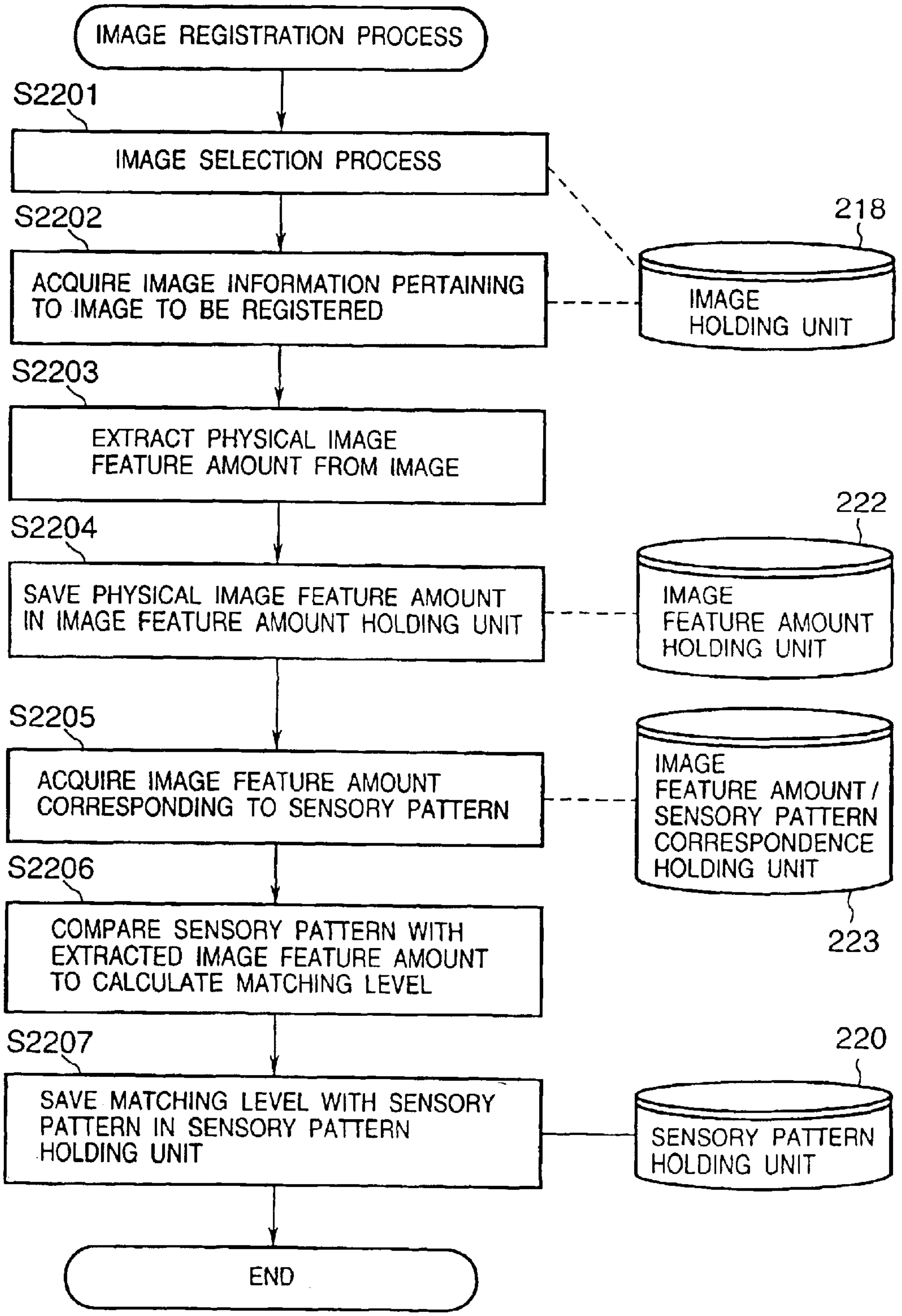
FIG. 22 is a flow chart showing an image registration process in the embodiment of the present invention.

FIG. 22 is a flow chart showing the image registration process in the embodiment of the present invention.

This process is controlled in accordance with a processing program stored in the DISK 14.

In step S2201, the user designates an image to be registered. The image to be registered is designated from those stored in an external storage device, an image input device, an image database server connected to this image processing apparatus, or the like (none of them are shown). In this embodiment, assume that images serving as test images are stored in advance, and the image to be registered is selected from them.

In step S2202, an image ID corresponding to an image file name of the designated image, and various kinds of image information required for registration care acquired and are supplied to the image feature extraction processing unit 221. The image ID is stored in correspondence with the image file name to manage an images and is acquired by searching data in the image holding unit 218 using the image filename. Various kinds of image information of the image include pixel values indicating the width and height of an image, the number of bits per pixel, the image size (in units of bytes) he address of the area where a bitmap image is actually stored, and the like, for example, when the file format of this image is the bitmap format. Since these pieces of image information are stored in the header field of the image file, they can be acquired by referring to the header field. Even when the file format of he image is not the bitmap format but JFIF or FlashPix, required information can be similarly obtained from the header field of a file. Or the image holding unit 218 may store such image information, and the image information may be acquired by referring to the image holding unit 218 upon registration.

In step S2203, physical image feature amounts are extracted by analyzing the image information corresponding to the designated image ID. This process is done by the image feature amount extraction processing unit 221. An example of this process is as has already been described previously with reference to FIG. 16. FIG. 16 shows an example of the image feature amounts in this embodiment, and representative colors are extracted in units of image regions/blocks. The representative color may be obtained by using a scheme of analyzing an actual bitmap image using various kinds of input image information in units of pixels, and calculating the average value of color components (values in a color space such as RGB, HVC, or the like) used in each region or block, or a color component with the highest frequency of occurrence as a representative color.

In step S2204, extracted image feature amounts c1 to cn are stored in the image feature amount holding unit 222 in correspondence with the image ID of that image. This example is as has already been described previously with reference to FIG. 17.

In step S2205, all sensory pattern IDs stored in the image feature amount/sensory pattern correspondence holding unit 223, and image feature amounts corresponding to those sensory patterns are acquired with reference to the image feature amount/sensory pattern correspondence holding unit 223. This example is as has already been described previously with reference to FIG. 7.

In step S2206, the matching level between the acquired sensory pattern and the image feature amounts corresponding to the image is calculated. This process is done by the sensory pattern determination processing unit 224. That is the chromatic image feature amounts corresponding to each of the sensory patterns acquired in step S2205 are compared with the image feature amounts extracted in step S2203 to calculate their matching level. In this case, the matching levels for all sensory patterns stored in the image feature amount sensory pattern correspondence holding unit 223 are calculated. The matching level is calculated using a scheme such as vector computations, statistic processes, or the like using cosine measure.

In step S2207, the matching levels between all the sensory patterns and the image calculated in step S2206 are stored in the sensory pattern holding unit 220 in correspondence with the image ID of that image. This example is as has already been described previously with reference to FIG. 5.

The aforementioned process is done for all images to be registered.

As described above, according to this embodiment, since both the feature amount of multimedia information itself corresponding to a query word which indicates multimedia information wanted, and the content word that describes the contents of multimedia information are used as query conditions on the basis of associative words associated with the query word, desired multimedia information wanted can be accurately extracted.

For example, in a conventional system, when "sea" is obtained as a word which is associated with a query word "refreshing", a search result "rough sea" is highly likely to be found. However, in this embodiment, such result is excluded when it is integrated with search results using sensory patterns obtained from a combination "refreshing"—"sea".

Since multimedia information can be searched based on associative words that express the contents pertaining to a query word indicating desired multimedia information, and the feature amount of multimedia information itself is used, multimedia information having an inappropriate feature amount which Cannot meet the query word can be accurately extracted.

In the above embodiment, image information is used as information wanted. As for multimedia information (e.g. audio information) other than image information, the present invention can be applied by executing information feature amount extraction, and corresponding the extracted information feature amount to sensory patterns.

In the above description, the image holding unit 218, image content word holding unit 219, and sensory pattern holding unit 220 which undergo a search are allocated on the DISK 14 that builds a single device, but these building components may be distributed on different devices, and processes may be done on the network via the NIC 19.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invent ion.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An information search apparatus for searching information based on an input query word, comprising:

first search means for determining a query keyword on the basis of the query word, and searching the information by comparing the query keyword with a feature keyword expressing a feature of the information, wherein said feature keyword is stored in association with the information;

second search means for determining a feature amount corresponding to the query word, and searching the information by comparing the determined feature amount with a feature amount extracted from the information, wherein said extracted feature amount is stored in association with the information; and generation means for generating search result information based on both results obtained by said first and second search means.

2. The apparatus according to claim 1, further comprising:

an associative word dictionary in which index words and associative words associated with the index words are registered in correspondence with each other, wherein said first search means determines as query keywords the query word and an associative word found by searching said associative word dictionary using the query word.

3. The apparatus according to claim 2, wherein said associative word dictionary registers an association strength indicating an association relationship strength between each associative word and index word, said first search means obtains a search matching level of each information found by search on the basis of the association strength of each associative word, and said second search means searches the information with reference to the search matching levels obtained by said first search means.

4. The apparatus according to claim 3, further comprising:

acquisition means for acquiring a contrary associative word indicating an antithetic concept to the query word, and wherein said first search means lowers a search matching level of an image found by search using the contrary associative word acquired by said acquisition means.

5. The apparatus according to claim 2, further comprising:

a representative pattern dictionary for corresponding representative patterns in units of pairs of query word and associative words, and wherein said second search means searches said representative pattern dictionary to acquire a corresponding pattern using a combination of a query word and associative word, and searches information on the basis of a feature amount of the acquired representative pattern.

6. The apparatus according to claim 1, wherein the information is image information, and the feature amount is a physical image feature amount obtained by analyzing the image information.

7. The apparatus according to claim 6, wherein the feature amount includes at least one of color scheme information, composition information, and shape information of an image.

8. An information search method for searching information based on an input query word, comprising:

a first search step for determining a query keyword on the basis of the query word, and searching the information by comparing the query keyword with a feature keyword expressing a feature of the information, wherein said feature keyword is stored in association with the information;

a second search step for determining a feature amount of a pattern corresponding to the query word, and searching the information by comparing the determined feature amount with a feature amount extracted from the information, wherein said extracted feature amount is stored in association with the information; and generating search result information based on both results obtained in the first and second search steps.

9. The method according to claim 8, further comprising:

an associative word dictionary in which index words and associative words associated with the index words are registered in correspondence with each other, wherein the first search step includes the step of determining as query keywords the query word and an associative word found by searching said associative word dictionary using the query word.

10. The method according to claim 9, wherein said associative word dictionary registers an association strength indicating an association relationship strength between each associative word and index word, the first search step includes obtaining a search matching level of each information found by the search on the basis of the association strength of each associative word, and the second search step searches the information with reference to the search matching levels obtained in the first search step.

11. The method according to claim 10, further comprising:

acquiring a contrary associative word indicating an antithetic concept to the query word, and wherein the first search step includes lowering a search matching level of an image found by search using the contrary associative word acquired in the acquisition step.

12. The method according to claim 9, further comprising:

a representative pattern dictionary for corresponding representative patterns in units of pairs of query word and associative words, and wherein the second search step includes searching said representative pattern dictionary to acquire a corresponding pattern using a combination of query word and associative word, and searching information on the basis of a feature amount of the acquired representative pattern.

13. The method according to claim 8, wherein the information is image information, and the feature amount is a physical image feature amount obtained by analyzing the image information.

14. The method according to claim 13, wherein the feature amount includes at least one of color scheme information, composition information, and shape information of an image.

15. A computer readable memory for storing a computer program for searching information based on an input query word, the computer program comprising:

code for a first search step to determine a query keyword on the basis of the query word, and to search information by comparing the query keyword with a feature keyword expressing a feature of the information, wherein said feature keyword is stored in association with the information;

code for a second search step to determine a feature amount corresponding to the query word, and to search information by comparing the determined feature amount with a feature amount extracted from the information, wherein said extracted feature amount is stored in association with the information; and code to generate search result information based on both results obtained in the first and second search steps.

* * * * *